United States Patent [19]
Keller et al.

[11] Patent Number: 5,361,804
[45] Date of Patent: Nov. 8, 1994

[54] WATER CONSERVATION VALVE

[76] Inventors: Myron C. Keller, 23327-84th Pl. South, Kent, Wash. 98032; Michael C. McDonald, 2605-210th Ave. East, Sumner, Wash. 98390

[21] Appl. No.: 967,722

[22] Filed: Oct. 28, 1992

[51] Int. Cl.⁵ .............................................. F16K 31/524
[52] U.S. Cl. ................................ 137/801; 239/428.5; 239/583; 251/258; 251/263; 251/337; 261/DIG. 22
[58] Field of Search ............................ 4/678; 137/801; 239/428.5, 583; 251/258, 263, 337; 261/DIG. 22

[56] References Cited

U.S. PATENT DOCUMENTS

| | | | |
|---|---|---|---|
| 955,641 | 4/1910 | Gielow | 251/258 |
| 988,521 | 4/1911 | Thurston | 251/258 |
| 1,638,020 | 8/1927 | Tibble | 251/258 |
| 1,701,217 | 2/1929 | Schoenbucher | 251/258 |
| 2,783,035 | 2/1957 | Rosenberg | 239/428.5 |
| 2,785,881 | 3/1957 | Dolan | 239/428.5 X |
| 3,664,589 | 5/1972 | Jatho et al. | 239/428.5 |
| 3,987,965 | 10/1976 | Puma | 239/583 |
| 4,181,987 | 1/1980 | Kesselman | 137/901 X |
| 4,605,200 | 8/1986 | Huppee | 251/262 X |
| 4,667,349 | 5/1987 | Son | 137/801 X |

*Primary Examiner*—Gerald A. Michalsky
*Attorney, Agent, or Firm*—Seed and Berry

[57] ABSTRACT

A valve assembly for a faucet is operated by an actuation lever(s) normally positioned to be engaged by a container, for example, into which water is to be discharged from the faucet. For normal operation the lever(s) is moved in a self-return range of about 10 to 50 degrees. The lever(s) can also be swung further to a fully-on position so that the faucet can function in the normal manner by its valve system. The lever(s) operate a cam which acts on a cam follower presented by a valve stem. Responsive axial movement of the valve stem in opposition to spring pressure opens a valve.

4 Claims, 10 Drawing Sheets

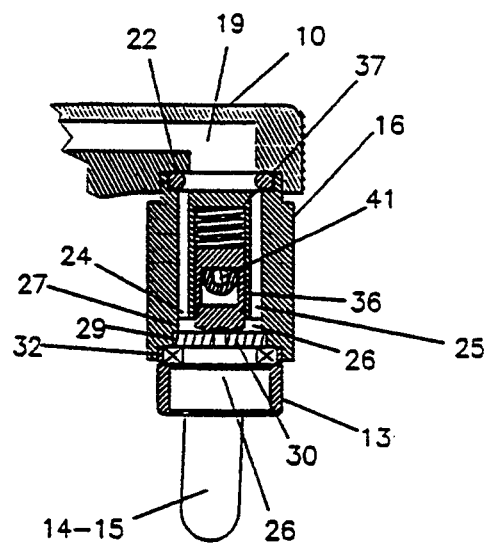
FIG. 5
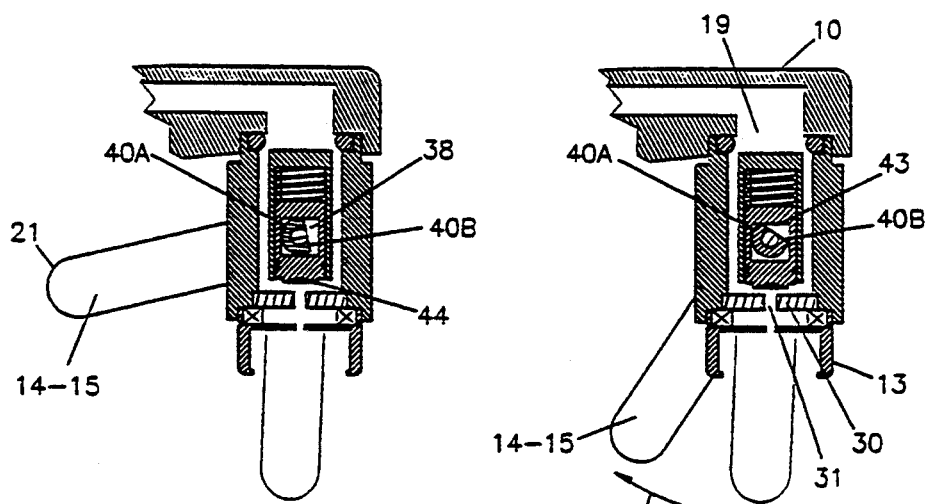
FIG. 7
FIG. 6

WATER CONSERVATION VALVE

TECHNICAL FIELD

This invention relates to water conservation valves added to faucet spouts and the like to control the amount of water consumed and to facilitate the ease of turning water on and off independently of other valves in the faucet installation. The invention is intended to be added to existing faucets without modification or built into new faucets during manufacture.

BACKGROUND OF THE INVENTION

In many areas of the world, there is a shortage of potable water. Additionally, the supply of water in boats and recreational vehicles is limited by the size of on-board tanks. In order to maximize the available water, people attempt to minimize the time the water is running. When a separate handle for hot and cold water is used, each time the water is turned on and off, the temperature has to be readjusted. The process results in excess use of water. In the case where there is a single mixing valve, there is a tendency to not turn the water off without conscious thought. Furthermore, children often have difficulty reaching the back of the sink to turn a valve on and off, and some disabled people do not have enough control of their hand movement to satisfactorily operate normal faucet controls. As a result water is wasted unnecessarily.

There has been a need for an inexpensive water saving valve which can be easily attached to existing faucets, such as kitchen sink faucets, for example, and is convenient to use. This need is not met adequately by faucet valves designed to sense the presence of a potential user, or those having a self-closing foot operated valve or switch, or those having a timing mechanism.

U.S. Pat. No. 4,181,987 discloses an add-on valve mechanism which can be easily mounted between the faucet spout and outlet nozzle on a sink fixture. It comprises a spring-loaded ball which can be unseated from a conical valve seat by manual operation of a flip lever on the side of the valve housing. The device has a snap action and is designed to have its valve remain either in a full-on or full-off position until the operator applies a force to the flip lever. The flip-action swing range of the flip lever from the full-off position before it flips completely to the full-on position does not permit the operator to conveniently push the lever to only a partly-on self-closing position while collecting the flowing water or washing with it.

SUMMARY OF THE INVENTION

The present invention provides a simple to install and use device that may be placed between the faucet and aeration nozzle in a normal sink installation, or includes an aeration device and operates when the valve system of the faucet is supplying water. The device includes a pair of coacting actuation levers that can easily be activated by the fingers, the back of the hand or a glass etc. The invention can be operated with equal ease by either the right or left hand.

The actuation levers of the invention are normally positioned vertically downward and extend to a level lower than the faucet outlet nozzle. For normal operation one or both of the levers is moved backward in a range of about 10 to 50 degrees, to turn the water on. When the levers are released they will self-return to the off position. The levers can also be rotated about 90 degrees forwardly or rearwardly to a fully-on position clear of the sink so that the faucet can function in the normal manner by its valve system.

The invention includes a slide-mounted valve which is normally biased into closed position by a spring and/or the water pressure. The actuator levers of the device activate a cam which is engaged by a cam follower on the stem of the valve so that swinging of the levers turns the water on by moving the valve away from its seat when the levers are moved backwards or forward from an "off" position in which the levers project downwardly below the level of the housing for the valve. The cam is designed such that when the levers are released, while in a preset swing range of approximately 90 degrees from the "off" positions, the valve will automatically close, returning the handles to the downward off position. This arrangement assures that water consumption will be minimized. Movement of the levers beyond the preset swing range will allow the water to remain on until the levers are moved to the automatic shutoff region.

BRIEF DESCRIPTION OF THE DRAWINGS

FIGS. 5, 6 and 7 are vertical sectional views of the valve unit taken as indicted by lines 5—5 in FIG. 4, and illustrating the positions of the components of the valve unit when the control levers are in closed position, self-closing partially open position, and fully open position, respectively;

DETAILED DESCRIPTION OF THE INVENTION

Figure 1:
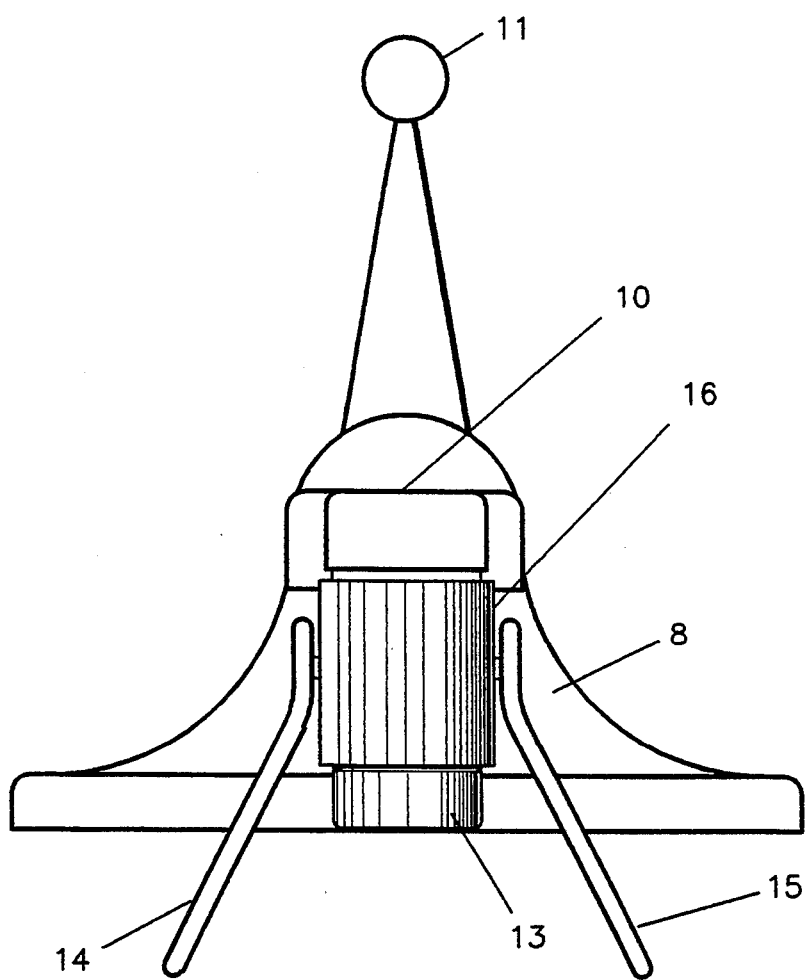
FIG. 1 is a front elevational view of a faucet assembly and equipped with the water conservation valve unit of the present invention.
Figure 2:
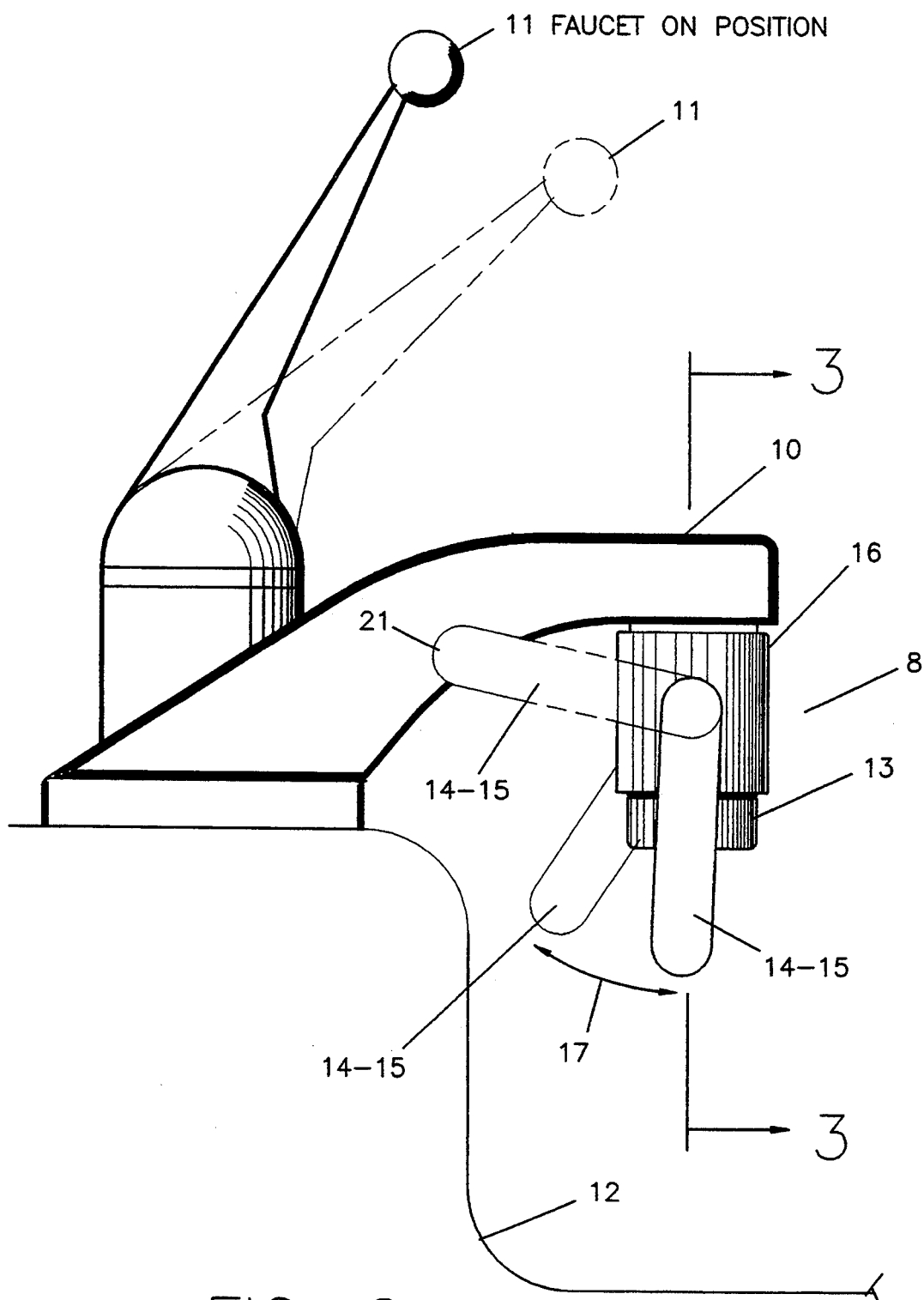
FIG. 2 is a side elevational view of the faucet assembly and illustrating operating positions of the control levers on the valve unit.
Figure 3:
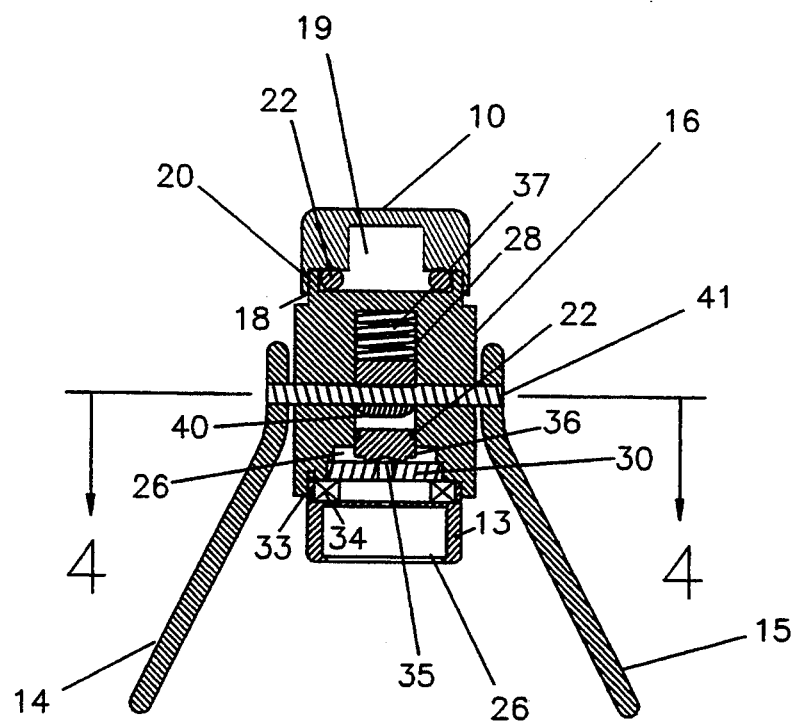
FIG. 3 is a vertical sectional view taken as indicated by line 3—3 in FIG. 2.
Figure 4:
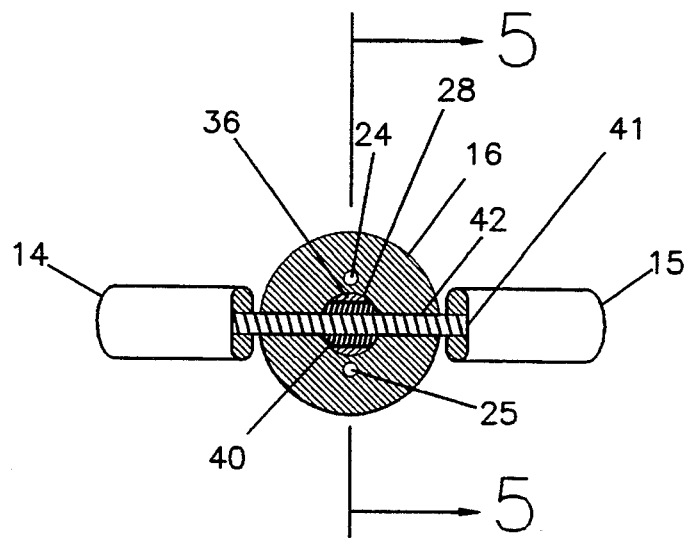
FIG. 4 is a vertical sectional view taken as indicated by line 3—3 in FIG. 3, but with the valve opened.
Figure 8:
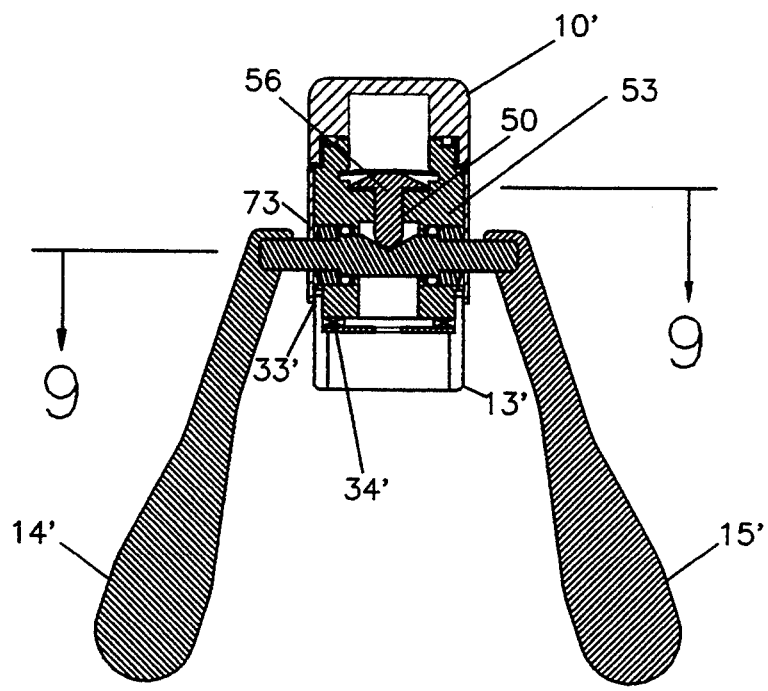
FIG. 8 is a vertical longitudinal sectional view, corresponding to FIG. 3, of a second embodiment of the invention.
Figure 9:
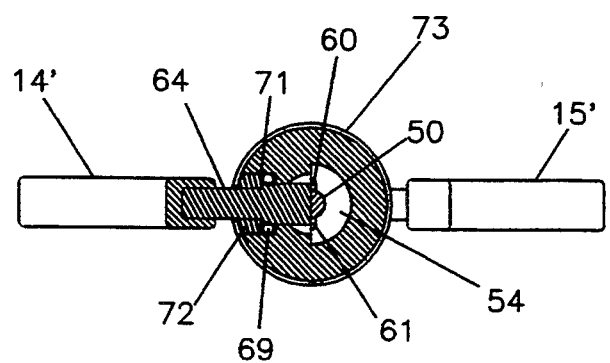
FIG. 9 is a transverse sectional view taken as indicated in line 9—9 of FIG. 8.
Figure 10:
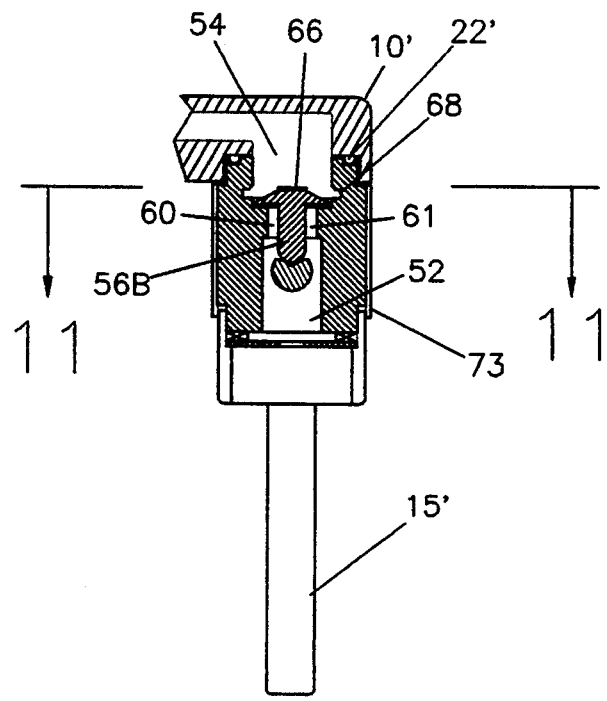
FIG. 10 is a vertical longitudinal sectional view, corresponding to FIG. 5, of the second embodiment.
Figure 11:
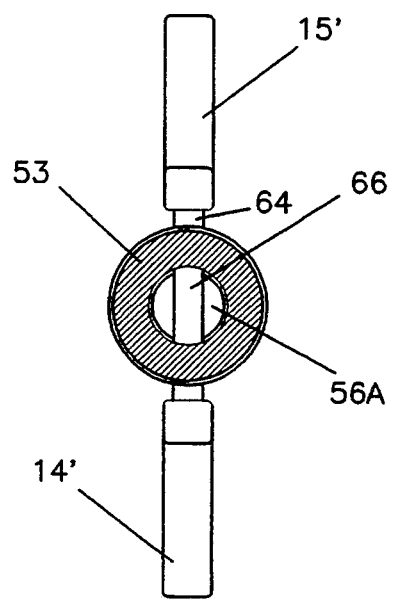
FIG. 11 is a transverse sectional view taken as indicated by line 11—11 in FIG. 10.
Figure 12:
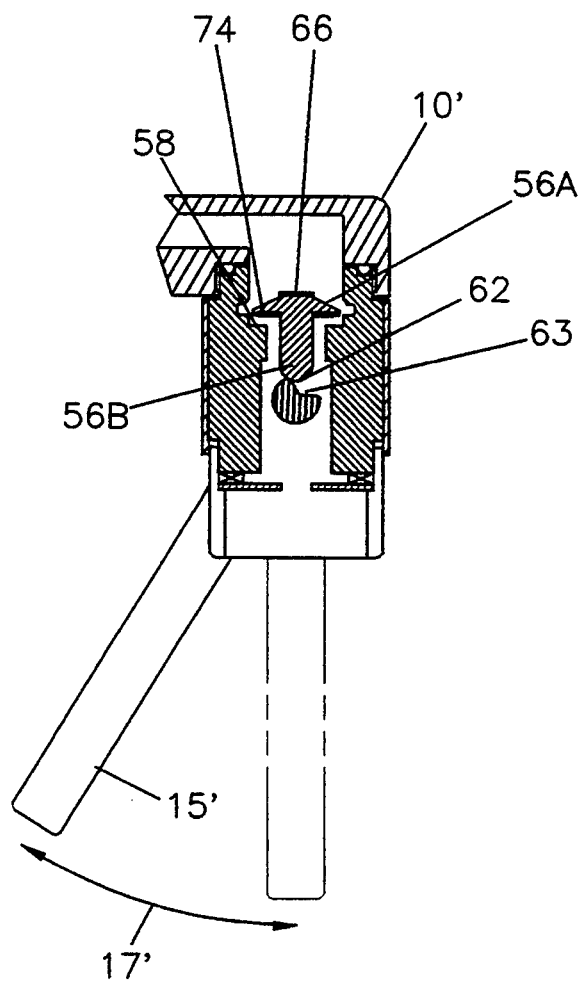
FIG. 12 is a vertical sectional view, corresponding to FIG. 6, of the second embodiment.
Figure 13:
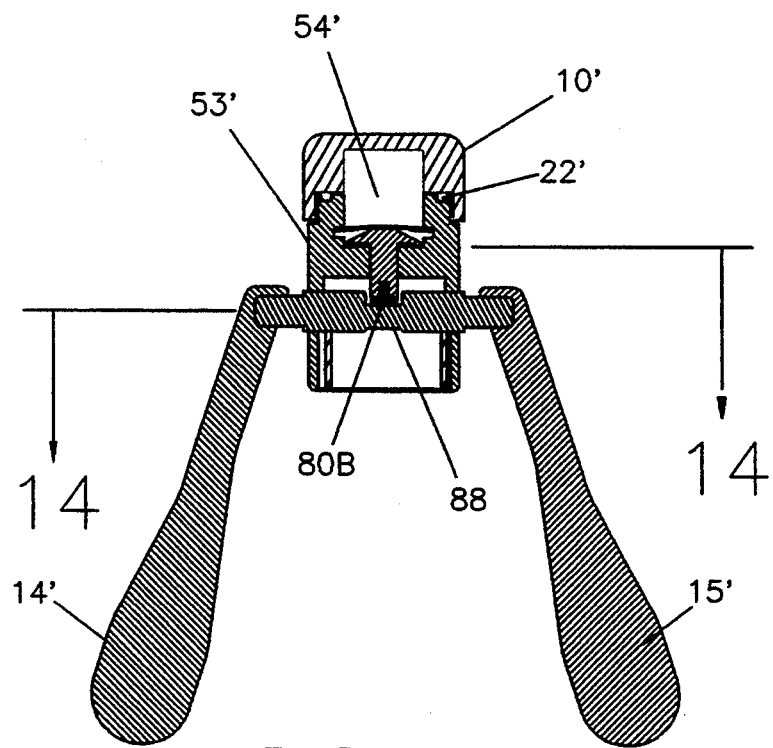
FIG. 13 is a vertical longitudinal sectional view, corresponding to FIGS. 3 and 8, of a third embodiment of the invention.
Figure 14:
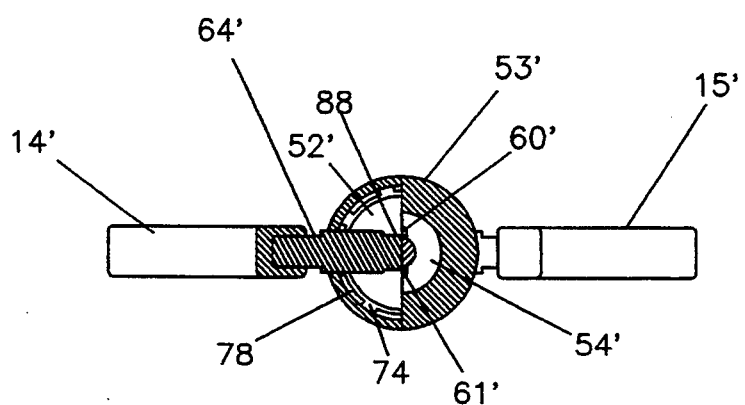
FIG. 14 is a transverse sectional view taken as indicated by line 14—14 in FIG. 13.
Figure 15:
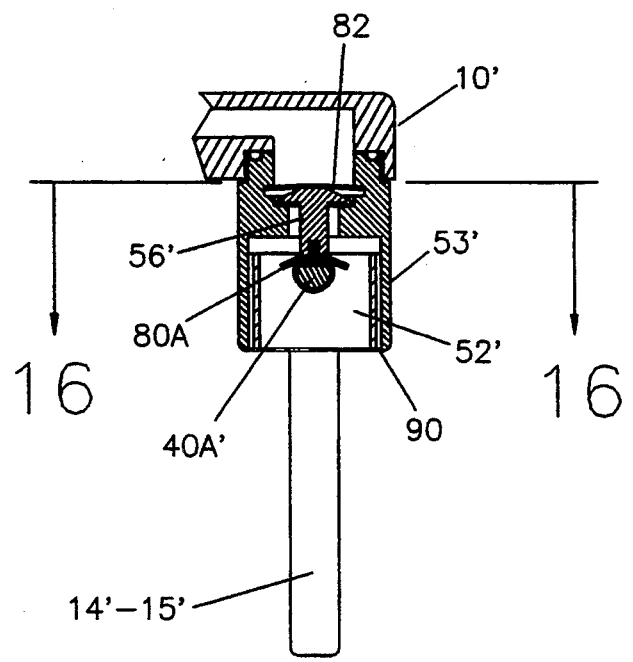
FIG. 15 is a longitudinal sectional view, corresponding to FIGS. 5 and 10, of the third embodiment.
Figure 16:
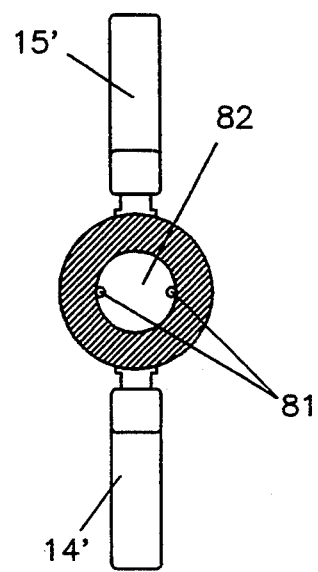
FIG. 16 is a transverse sectional view taken as indicated by line 16—16 in FIG. 15.
Figure 17:
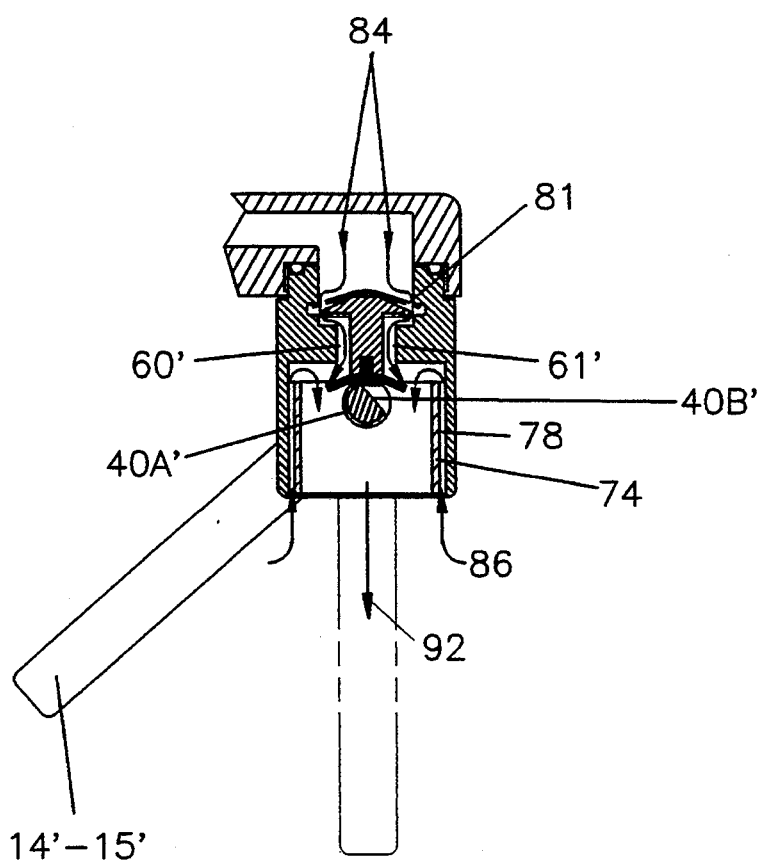
FIG. 17 is a vertical longitudinal sectional view of the third embodiment corresponding to FIG. 7.

Referring to the drawings, the valve unit 8 of the present invention is shown for purposes of example applied to the swivel spout 10 of a standard faucet unit of the type having a single control handle 11 for controlling the flow volume and hot/cold ratio of the water into a sink 12. The spout is internally threaded at its discharge end to receive an aeration nozzle 13. Preparatory to application of the present invention the aeration nozzle is unscrewed from the spout 10, and the intake end of the body of the valve unit is then screwed into the position previously occupied by the nozzle, whereupon the nozzle may be repositioned as the outlet for the valve unit.

The valve unit 8 has a pair of coacting control levers 14-15 whereby the volume of water otherwise permitted to discharge from the nozzle 13 in accordance with the setting of the control handle 11 can be further controlled. The control levers 14-15 depend on opposite sides of the valve unit when in a shutoff position such as to be conveniently engageable, for example, by a glass or other receptacle being positioned beneath the nozzle for filling. Rearward pushing of the control levers opens the valve unit. The valve unit can also be operated responsive to forward pulling of the control levers from the depending shut-off position. In either instance the valve unit automatically closes upon release of the control levers after an initial opening range of movement. Further movement beyond this range results in the valve unit being held open.

Directing attention now to the structural details of the valve unit 8, the body 16 thereof has an externally threaded inlet neck 18 designed to screw into the faucet spout 10 in the position formerly occupied by the nozzle 13. The inside of the neck 18 provides an entry chamber 19 and is formed with an annular shoulder 20 to serve as a seat for an O-ring 22 to seal the screw connection between the valve body 16 and the spout 10.

At the inner edge of the shoulder 20 the valve body 16 has a pair of diametrically opposite longitudinal flow passages 24, 25 which extend from the entry chamber 19 to a three-stepped discharge chamber 26 at the discharge end of the valve body. The innermost step 27 of the chamber 26 surrounds the bottom of an axial central bore 28 closed at its upper end, and the intermediate step 29 receives a disc 30 having a central discharge port 31. The outermost step 32 is surrounded by an internally threaded discharge portion 33 into which the nozzle 13 is threaded and serves as a seat for a sealing gasket 34 which partly bears against the disc 30 to hold it against the intermediate step 29.

The disc 30 serves as a seat for the head 35 of a valve having its stem 36 mounted in the central bore 28 and urged to slide downwardly by a compression spring 37 into a position whereat the head 35 shuts off flow through the discharge port 31. The stem 36 has a central slot 38 receiving a cam 40 mounted on a shaft 41. This shaft extends through a transverse through-bore 42 in the valve body 16 and intersects the central bore 28 at right angles to a plane through the longitudinal center axis of the bore 28 and the two flow passages 24-25. The shaft 41 projects laterally at both of its ends beyond the valve body 16 and has the control levers 14-15 mounted thereon.

The upper end face 43 of the slot 38 functions as a cam follower. The cam 40 has a rounded bottom face 40A and has a flat upper face 40B which is parallel to the cam follower face 43 and is slightly spaced therefrom when the valve 36 engages the disc 30 to close off flow. The lower end of the stem 36 is preferably formed with an annular projection 44 to seat against the disc 30.

Directing attention to FIGS. 5–7, the lower rounded portion 40A of the cam 40 is brought into contact with the cam engagement face 43 by forward or rearward swinging movement of the control levers 14–15, and this causes the stem 36 to lift in opposition to the spring 37 and expose the central discharge opening 31 in the disc to flow of water from the passages 24–25. The spring 37 will cause the stem 36 to move downwardly into flow closing position when the levers 14–15 are released unless the upper face 40B of the cam 40 has been turned to about a vertical position by a corresponding upward swing of the levers. In other words the valve will self-close through a generous initial rearward or forward swing range of the control levers, and the valve will be held open by the lower face 40b of the cam 40 when the control levers are swung sufficiently to bring the lower face 40a into contact with the cam engagement face 43.

In a second embodiment of the invention a central bore 50 in a housing 53 extends along a longitudinal axis between discharge and entry chambers 52, 54; and the valve takes the form of a popper valve 56 having its enlarged head 56a seating against an annular seat 58 at the inner end of the entry chamber 54 when in a closed position. When closed the valve 56 prevents flow from the entry chamber 54 to a pair of passages 60–61 which extend longitudinally between the chambers 52, 54 at opposite sides of the central bore 50. For compactness these passages 60–61 may intersect the central 50 bore along their length as shown.

The stem 56b of the valve 56 projects from the central bore 50 into the discharge chamber 52 and its projecting end is rounded to function as a cam follower 62 to engage a central cam groove 63 provided by a transverse shaft 64 upon which a pair of control levers 14–15 are mounted as before. The valve 56 is biased by a flat spring 66 which engages the head 56a of the valve and is retained at its ends in an annular groove 68 in the wall of the entry chamber 54. The pressure of the incoming water also urges the valve 56 towards its closed position.

As in the first embodiment, the entry end of the housing 53 is threaded to make a screw connection with a threaded faucet spout and the discharge end is threaded to received an aerator unit 13. The cam groove 63 is shaped so that the low point of the groove, which corresponds to the closed position cf the valve 56, is engaged by the cam follower 62 when the levers 14–15 are directed away from the faucet spout to occupy positions approximately in the plane defined by the longitudinal axis of the housing and the transverse axis along the shaft 64. The cam groove 63 gradually decreases in depth in both circumferential directions from the low point so that when the levers 14–15 have been swung about a quarter turn or further in either direction the cam groove face will hold the valve 56 in open position. Otherwise the action of the pressure of the incoming water and of the spring 66 on the head 56a of the valve 56 will self-close the valve when the levers 14–15 are released.

The lever shaft 64 may be provided with O-ring seals 69 which seat in transverse counter bores 71 and are retained by retainer rings 72 sleeved on the shaft and threaded into the counter bores or otherwise held in retaining position.

A third embodiment of the invention integrates the aerator into the valve housing rather than having the aerator as a separate unit which is screwed onto the housing as in the second embodiment. Similar parts in the second and third embodiments are given the same identifying numerals in the drawings followed by a prime.

In the third embodiment the housing 53' is extended to lengthen the discharge chamber 52' so that a corrugated cylindrical insert 74 can be press-fitted therein to provide longitudinal air passages 78 between the insert and the side wall of the discharge chamber. A gap 79 is provided between the inner end of the insert 74 and the end wall of the discharge chamber so that air from the air passages 78 can discharge into the discharge chamber 52' adjacent the discharge end of the longitudinal flow passages for the water. Mixing of the air and water is aided by sloped diffuser wings 80A on a diffuser 80 fixed on the valve stem 56' such that the wings are in the path of the water exiting from the longitudinal passages 60'-61'. The central portion 80B of the diffuser 80 acts as a cam follower and rides on the face of an annular cam groove 62' in the lever shaft 64'. As before the valve 56' self-closes during approximately the first 90 degrees of swinging travel of the levers 14-15 in either direction of travel from a downwardly directed central position corresponding to the closed position of the valve.

It will be appreciated that, although specific embodiments of the invention have been described herein for purposes of illustration, various modifications may be made without deviating from the spirit and scope of the invention. Accordingly, the invention is not limited except as by the appended claims.

We claim:
1. A valve assembly comprising:
   a valve housing with a liquid entry chamber extending from an entry end and a liquid discharge chamber extending from a discharge end,
   said housing having a longitudinal axis and a liquid flow passage between said chambers which is offset from said longitudinal axis;
   a valve in said entry chamber having a stem which is slide-mounted in said housing along said longitudinal axis and extends into said discharge chamber, said valve having open and closed positions in which flow through said passage is open and closed, respectively;
   a cam follower on said stem;
   a shaft extending transversely through said housing and arranged to turn about a transverse axis which intersects said longitudinal axis and extends across said discharge chamber, said shaft having a handle external of said housing and extending below the level of said discharge end when said valve is in its closed position;
   a cam on said shaft engaged by said cam follower in said discharge chamber and adapted responsive to turning of the shaft to move said valve between said open and closed position;
   biasing means urging said valve into closed position;
   aerator means in said discharge chamber for directing air from outside said housing into the path of liquid discharging from said flow passage into said discharge chamber; and
   a diffuser mounted on said stem above said shaft and spaced from said aerator means, said diffuser being arranged to be engaged by liquid discharging from said flow passage to assist in mixing such liquid with air incoming through said aerator means.

2. A valve assembly according to claim 1 in which said discharge chamber has a generally cylindrical outer wall, and said aerator means includes an insert engaging said outer wall and collectively therewith providing a plurality of longitudinal air passages, each of said air passages having an external air entry at said discharge end of the valve housing end and an air discharge in said discharge chamber, adjacent liquid flow from said flow passage into said discharge chamber.

3. A valve assembly according to claim 1 in which said housing has a second flow passage between said chambers, said flow passages being located on opposite sides of said longitudinal axis in a plane extending perpendicular to said transverse axis, said diffuser comprising a pair of wings projecting beneath said passages.

4. A valve assembly according to claim 3 in which said wings slope downwardly from said stem.

* * * * *